United States Patent [19]
Gutzwiller et al.

[11] 3,869,461
[45] Mar. 4, 1975

[54] INTERMEDIATES FOR QUININE, QUINIDINE AND DERIVATIVES THEREOF

[75] Inventors: Juerg Albert Walter Gutzwiller, Bettingen, Switzerland; Milan Radoje Uskokovic, Upper Montclair, N.J.

[73] Assignee: Hoffmann-La Roche Inc., Nutley, N.J.

[22] Filed: Apr. 26, 1973

[21] Appl. No.: 354,838

Related U.S. Application Data

[60] Division of Ser. No. 212,648, Dec. 27, 1971, Pat. No. 3,753,992, which is a continuation-in-part of Ser. No. 104,785, Jan. 7, 1971, abandoned, which is a continuation-in-part of Ser. No. 837,304, June 27, 1969, abandoned, which is a continuation-in-part of Ser. No. 741,913, July 2, 1968, abandoned.

[52] U.S. Cl. .............................. 260/284, 260/288 R
[51] Int. Cl. ............................................... C07d 33/50
[58] Field of Search ...................... 260/284 R, 288 R

[56] References Cited
UNITED STATES PATENTS

| | | | |
|---|---|---|---|
| 2,226,568 | 12/1940 | Marks | 260/284 |
| 2,492,487 | 12/1949 | Koeppy et al. | 260/288 R |
| 2,502,264 | 3/1950 | Lutz et al. | 260/288 R |
| 3,163,653 | 12/1964 | Ochiai et al. | 260/284 |
| 3,238,212 | 3/1966 | Brossi | 260/288 R |
| 3,391,146 | 7/1968 | Godfrey | 260/288 R |
| 3,828,048 | 8/1974 | Tixier | 260/284 |

OTHER PUBLICATIONS
Renfrew et al., "Chemical Review," (1942), p. 49–55.

*Primary Examiner*—Donald G. Daus
*Assistant Examiner*—Mary C. Vaughn
*Attorney, Agent, or Firm*—Samuel L. Welt; Bernard S. Leon; William G. Isgro

[57] ABSTRACT

Quinine, quinidine, their antipodes or racemates and derivatives thereof, are prepared by (a) cyclizing the correspondingly substituted 4-[3-(1-chloro-3(R)-alkyl(or alkenyl)-4(R)-piperidyl)-1-oxopropyl]quinolines, antipodes or racemates thereof, to the corresponding 4-[5(R)-alkyl(or alkenyl)-4(S)-quinuclidin-2(S) or 2(R)-ylcarbonyl]quinolines, antipodes or racemates thereof; and (b) stereoselectively reducing the products of step (a) to $\alpha$(S)-[5(R)-alkyl(or alkenyl)-4(S)-quinuclidin-2(R)-yl]-4-quinolinemethanols, antipodes or racemates thereof, and $\alpha$(R)-[5(R)-alkyl(or alkenyl)-4(S)-quinuclidin-2(S)-yl]-4-quinolinemethanols, antipodes or racemates thereof. Various intermediates and the end products are useful antimalarial and antiarrhythmic agents.

20 Claims, No Drawings

INTERMEDIATES FOR QUININE, QUINIDINE AND DERIVATIVES THEREOF

CROSS-REFERENCE TO RELATED APPLICATIONS

This is a division, of application Ser. No. 212,648 filed Dec. 27, 1971, now U.S. Pat. No. 3,753,992, issued Aug. 21, 1973, which in turn is a continuation-in-part of application Ser. No. 104,785, filed Jan. 7, 1971, now abandoned, which is a continuation-in-part of application Ser. No. 837,304, filed June 27, 1969, now abandoned, which in turn is a continuation-in-part of application Ser. No. 741,913, filed July 2, 1968 now abandoned.

SUMMARY OF THE INVENTION

The invention relates to a process for preparing quinine, quinidine and derivatives thereof which is exemplified by the following reaction scheme:

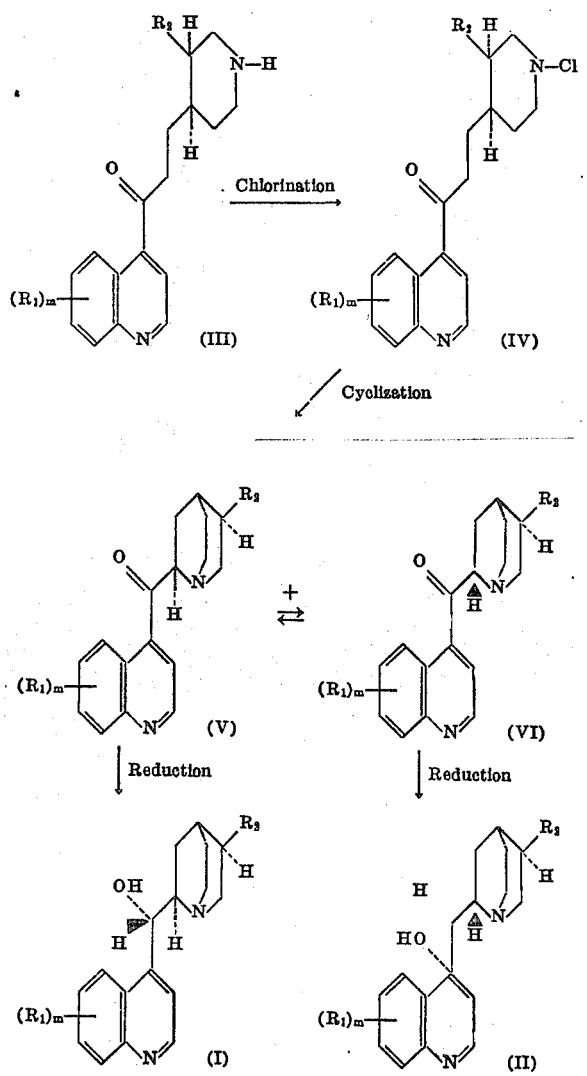

antipodes and racemates thereof;
wherein $m$ is 0, 1 or 2; $R_1$ is hydrogen, hydroxy, halogen, lower alkyl, lower alkoxy, trifluoromethyl, or, when $m$ is 2, $R_1$ taken together with an adjacent $R_1$ is also methylenedioxy; and $R_2$ is lower alkyl or lower alkenyl.

In another aspect, the invention relates to compounds of the formulas

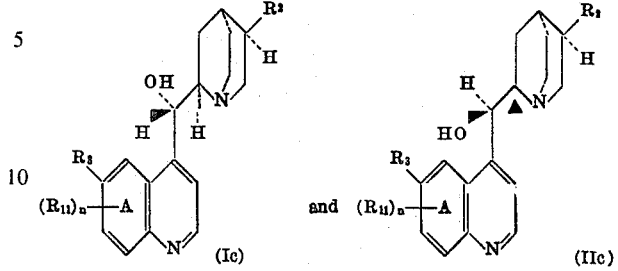

antipodes and racemates thereof;
wherein $n$ is 1 or 2; $R_2$ is lower alkyl or lower alkenyl; $R_{11}$ is hydrogen, hydroxy, lower alkyl, lower alkoxy, trifluoromethyl, halogen, or, when $n$ is 2, $R_{11}$ taken together with an adjacent $R_{11}$ is also methylenedioxy; when $R_{11}$ is hydrogen, $R_3$ is lower alkyl, trifluoromethyl or halogen; when $R_{11}$ is other than hydrogen and $n$ is 1, $R_3$ is lower alkoxy, lower alkyl, hydrogen, trifluoromethyl, halogen, or taken together with an adjacent $R_{11}$ is methylenedioxy; and when $R_{11}$ is other than hydrogen and $n$ is 2, $R_3$ is hydrogen,
and pharmaceutically acceptable acid addition salts thereof.

The compounds of Formulas Ic and IIc are useful antimalarial and antiarrhythmic agents.

In a further aspect, the invention relates to compounds of the formulas

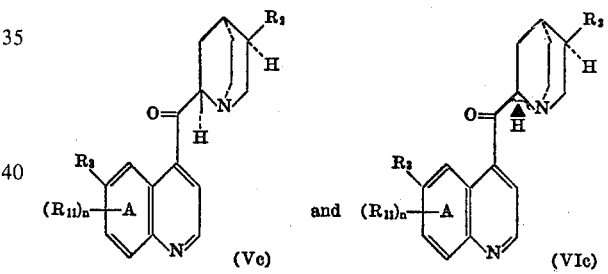

antipodes and racemates thereof;
wherein $R_2$, $R_3$, $R_{11}$ and $n$ are as previously described, and pharmaceutically acceptable acid addition salts thereof.

The compounds of Formulas Vc and VIc are useful as intermediates and as antimalarial and antiarrhythmic agents.

In still a further aspect, the invention relates to compounds of the formulas

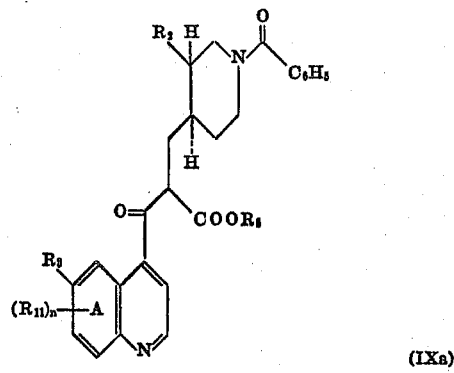

antipodes and racemates thereof

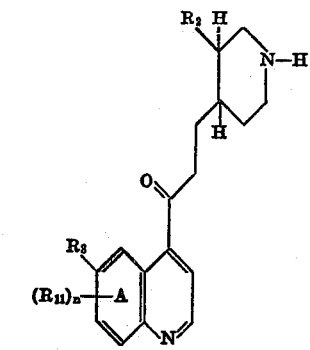

(IIIc)

antipodes and racemates thereof

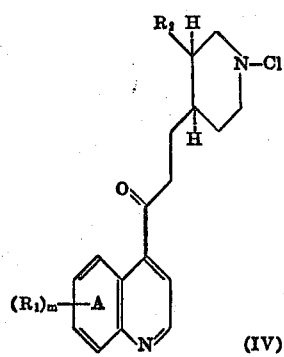

(IV)

antipodes and racemates thereof;
wherein $R_1$, $R_2$, $R_3$, $R_{11}$, $m$ and $n$ are as previously described, and $R_5$ is lower alkyl.

The compounds of Formulas IXa, IIIc and IV are useful as intermediates in the process of the invention.

DETAILED DESCRIPTION OF THE INVENTION

The term "lower alkyl" as used herein denotes a hydrocarbon group containing 1–7 carbon atoms, such as methyl, ethyl, propyl, butyl and the like; ethyl is preferred. The term "lower alkoxy" denotes a lower alkyl ether group in which the lower alkyl moiety is described as above. The term "lower alkenyl" as used herein denotes a hydrocarbon group containing 2–7 carbon atoms, such as vinyl, propenyl, butenyl and the like. Preferred is vinyl. The term "halogen" denotes all of the halogens, i.e., bromine, chlorine, fluorine and iodine.

As is evident from the above $R_1$ or $R_{11}$ or the like are individually selected from the various groupings hereinbefore described. Moreover, when $m$ or $n$ is 2, $R_1$ or $R_{11}$ or the like can additionally form with an adjacent $R_1$ or $R_{11}$ or the like the methylenedioxy radical. Thus, either when $m$ or $n$ is 1 or 2, $R_1$ or $R_{11}$ or the like can individually also represent hydrogen, hydroxy, halogen, lower alkyl, lower alkoxy or trifluoromethyl. Additionally, when $m$ or $n$ is 2, two adjacent groupings of $R_1$ or $R_{11}$ can together represent methylenedioxy.

The process aspect of the invention is exemplified by Reaction Scheme I:

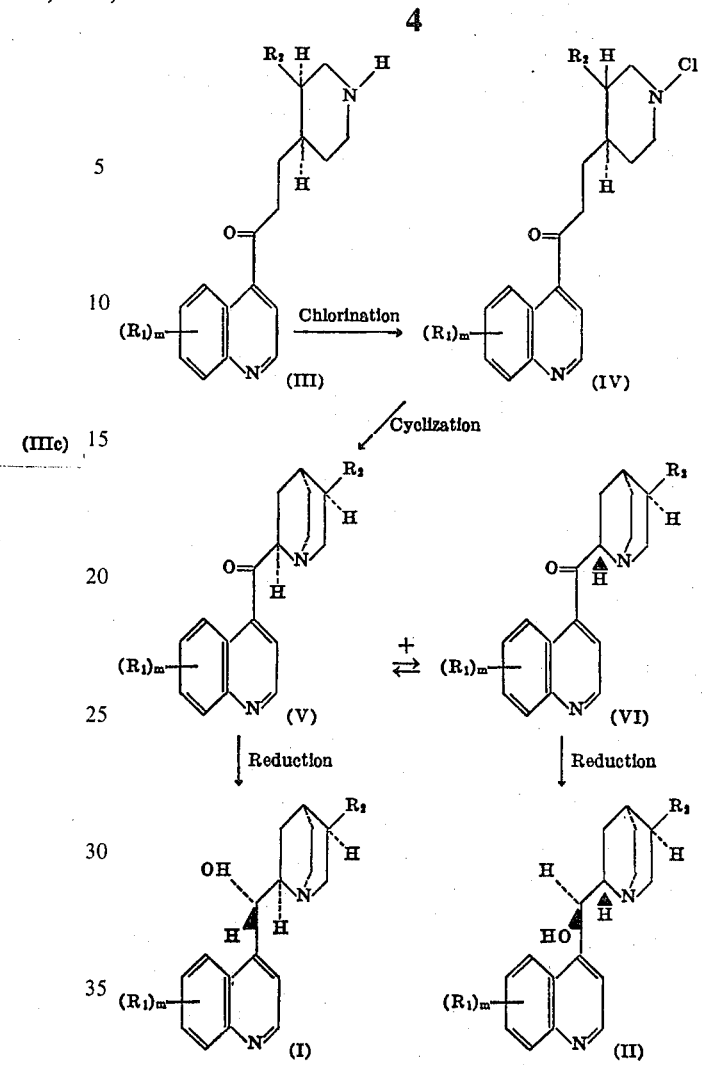

antipodes and racemates thereof
wherein $m$ is 0, 1 or 2; $R_1$ is hydrogen, hydroxy, halogen, lower alkyl, lower alkoxy or trifluoromethyl, or, when $m$ is 2, $R_1$ taken together with an adjacent $R_1$ is also methylenedioxy; and $R_2$ is lower alkyl or lower alkenyl.

In Reaction Scheme I, the 4-[3-(3(R)-alkyl(or alkenyl)-piperid-4(R)-yl)-1-oxopropyl]quinolines of Formula III, antipodes or racemates thereof, are converted to the corresponding 4-[3-(1-chloro-3(R)-alkyl(or alkenyl)-piperid-4(R)-yl)-1-oxopropyl] quinolines of Formula IV, antipodes or racemates thereof, utilizing a chlorinating agent such as sodium hypochlorite, N-chlorosuccinimide or the like. The chlorination is suitably carried out at room temperature or above, preferably at a temperature between 20° and 50°C. Moreover, the chlorination can be suitably carried out in the presence of an inert organic solvent, for example, a hydrocarbon such as benzene, a halogenated hydrocarbon such as dichloromethane or chloroform, or an ether such as ether or dioxane.

The 4-[3-(1-chloro-3(R)-alkyl(or alkenyl)piperid-4(R)-yl)-1-oxopropyl]quinolines of Formula IV, antipodes or racemates thereof, are converted to the corresponding epimeric 4-[5(R)-alkyl(or alkenyl)-4(S)-quinuclidin-2(R)-ylcarbonyl]quinolines of Formula V, antipodes or racemates thereof, and 4-[5(R)-alkyl(or alkenyl)-4(S)-quinuclidin-2(S)-ylcarbonyl]quinolines of Formula VI, antipodes or racemates thereof, under acidic conditions, utilizing a cyclizing agent. Exemplary of such agents are inorganic or organic acids such as mineral acids, for example, phosphoric acid and sulfuric acid; strong alkanoic acids, for example, trichloroacetic acid; and mixtures thereof, for example, acetic/sulfuric acid. The reaction is conveniently carried out at room temperature or above, preferably at a temperature between 20°C and 50°C. Moreover, the cyclization can be suitably carried out in the presence of an inert solvent of the type previously described. As mentioned above, the cyclization yields a mixture of the epimeric compounds of Formulas V and VI, which can be reacted further as such or can be separated into the respective epimers utilizing methods such as crystallization, and the like, and such epimer reacted separately.

The conversion of the 4-[5(R)-alkyl(or alkenyl)-4(S)-quinuclidin-2(R)-ylcarbonyl]quinolines of Formula V, antipodes or racemates thereof to α(S)-[5(R)-alkyl(or alkenyl)-4(S)-quinuclidin-2(R)-yl]-4-quinolinemethanols of Formula I, antipodes or racemates thereof, respectively, is carried out utilizing a stereoselective reducing agent, for example, a dialkylaluminum hydride, such as diisobutylaluminum hydride or the like. The reduction is suitably carried out at room temperature; however, temperatures above or below room temperature may be employed. It is preferred to employ a temperature between 20°C. and 50°C. The reduction can be conveniently conducted in the presence of an inert organic solvent, for example, a hydrocarbon such as benzene or toluene, or an ether such as diethylether, tetrahydrofuran or the like.

The conversion of the compounds of Formula V or their racemates to those of Formula I, antipodes or racemates thereof, respectively, when $R_2$ is lower alkyl, can also be effected utilizing a hydrogenation catalyst such as nickel, palladium, ruthenium, copper or barium chromite in the presence of a solvent, for example, an aqueous or non-aqueous alkanol such as methanol or ethanol, or an ether such as dioxane. When $R_2$ is lower alkyl or lower alkenyl, the conversion can be effected utilizing a hydrogenation agent such as aluminum in methanol, sodium isoproproxide in toluene, lithium aluminum hydride, aluminum hydride, chloroaluminum hydride, dichloroaluminum hydride, bromoaluminum hydride, dibromoaluminum hydride, lithium tri-tert.-butoxyaluminum hydride in ether, tetrahydrofuran, dioxane or the like.

The conversion of the 4-[5(R)-alkyl(or alkenyl)-4(S)-quinuclidin-2(S)-ylcarbonyl]quinolines of Formula VI, antipodes or racemates thereof, to the α(R)-[5(R)-alkyl(or alkenyl)-4(S)-quinuclidin-2(S)-yl]-4-quinolinemethanols of Formula II, antipodes or racemates thereof, respectively, is carried out according to the procedures described for the conversion of the compounds of Formula V.

The 4-{3-[3(R)-alkyl(or alkenyl)-piperid-4(R)-yl]-1-oxopropyl}-quinolines of Formula III, antipodes or racemates thereof, can be cyclized to the 4-[5(R)-alkyl(or alkenyl)-4(S)-quinuclidin-2(R) (or 2(S))-ylcarbonyl]quinolines of Formula V-VI, antipodes or racemates thereof, respectively, according to the reaction set forth in Scheme III:

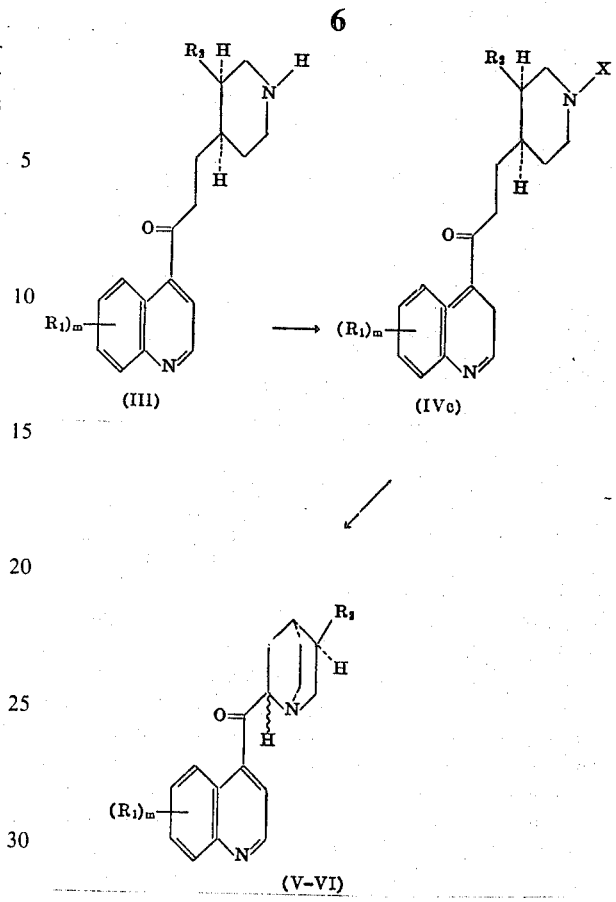

wherein $R_1$ is hydrogen, hydroxy, halogen, lower alkyl, lower alkoxy or trifluoromethyl, or, when $m$ is 2, $R_1$ taken together with an adjacent $R_1$ may be also methylenedioxy; $R_2$ is alkyl or lower alkenyl; $m$ is 0, 1 or 2; and X is halogen.

In Reaction Scheme III, the N-halogenation of the compounds of Formula III, antipodes or racemates thereof, to the corresponding N-halo compounds of Formula IVc, antipodes or racemates thereof, is effected utilizing a halogenating agent such as hypobromous acid, sodium hypochlorite, N-chlorosuccinimide, N-bromosuccinimide, N-bromoacetamide or the like, in an inert organic solvent, for example, an ether such as tetrahydrofuran, dioxane or the like; a chlorinated hydrocarbon such as methylene chloride, chloroform, carbon tetrachloride, or the like; or an alkanol such as methanol, ethanol, or the like.

The cyclization of the N-halo compounds of Formula IVc, antipodes or racemates thereof, to the corresponding compounds of Formula V-VI, antipodes or racemates thereof, is conducted under basic conditions, for example, with sodium ethoxide in ethanol, sodium methoxide in methanol, or the like, or under strongly acidic conditions, for example, with sulfuric acid, phosphoric acid, trichloroacetic acid, trifluoroacetic acid, acetic acid/sulfuric acid mixture or the like.

When $R_2$ in Formula III is lower alkyl, the cyclization of the compounds of Formula III to the corresponding compound of Formula V–VI can also be conducted according to the reaction set forth in Scheme IV.

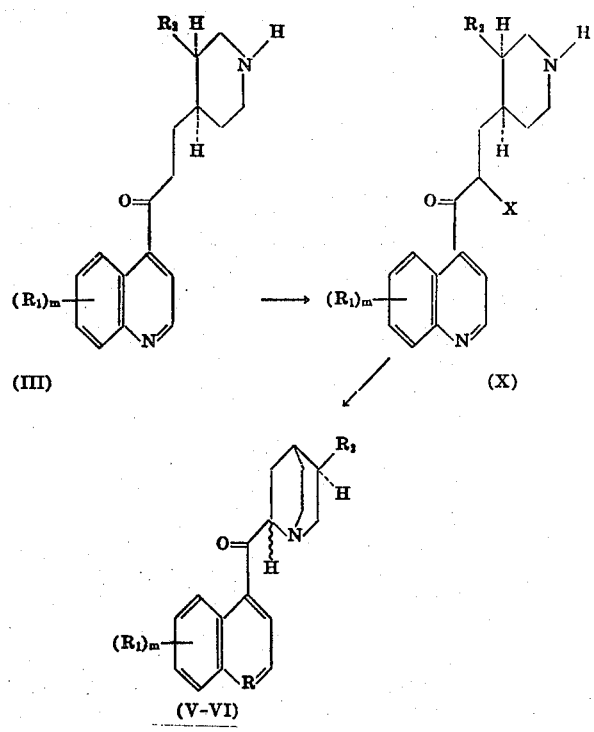

In Reaction Scheme IV, the C-halogenation of the compounds of Formula III, antipodes or racemates thereof, to the corresponding compounds of Formula X, antipodes or racemates thereof, can be effected with a halogenating agent, for example, molecular halogen, such as chlorine or bromine in the presence of a hydrogen halide such as hydrogen chloride or hydrogen bromide in water, ether, acetic acid or other inert organic solvents. The cyclization of the compounds of Formula X, antipodes or racemates thereof, to the corresponding compounds of Formula V-VI, antipodes or racemates thereof, is effected utilizing a sodium alkoxide such as sodium methoxide or sodium ethoxide, for example, in an alkanol such as methanol, ethanol, or the like.

When $R_2$ in Formula III is lower alkenyl, the cyclization can be effected according to the reaction set forth in Scheme V.

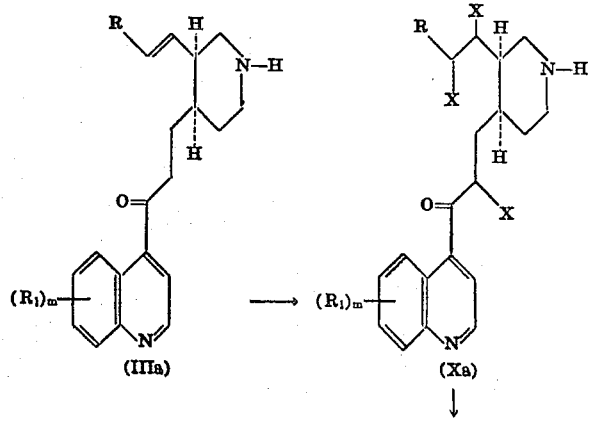

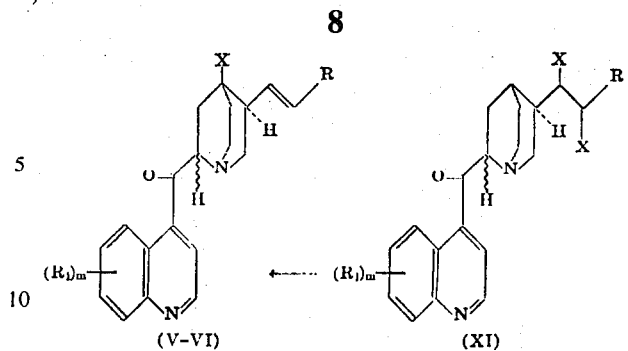

wherein R is lower alkyl.

In Reaction Scheme V, the halogenation of the compounds of Formula IIIa, antipodes or racemates thereof, to the corresponding compounds of Formula Xa, antipodes or racemates thereof, is effected utilizing a halogenating agent, for example, molecular halogen, such as chlorine or bromine in the presence of a halogen halide, such as hydrogen chloride or hydrogen bromide in water, ether, acetic acid or other inert organic solvents. The cyclization of the compounds of Formula Xa, antipodes or racemates thereof, to the corresponding compounds of Formula XI, antipodes or racemates thereof, is effected utilizing a sodium alkoxide such as sodium methoxide or sodium ethoxide in an alkanol such as methanol, ethanol or the like. The dehalogenation of the compounds of Formula XI, antipodes or racemates thereof, to the corresponding compounds of Formula V-VI, antipodes racemates thereof, is effected with, for example, sodium iodide.

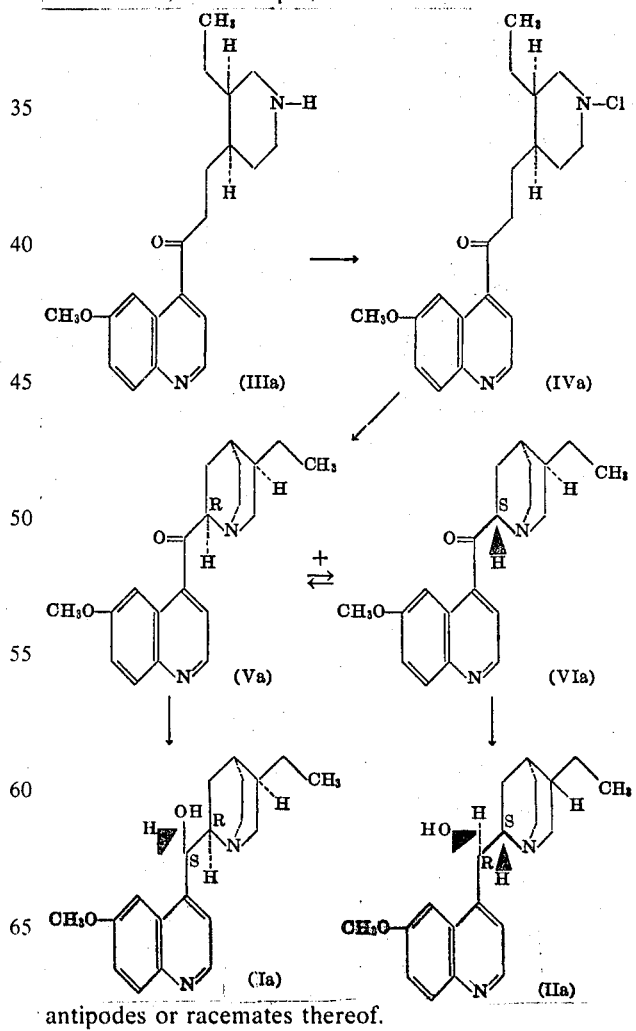

antipodes or racemates thereof.

Reaction Scheme Ia represents a preferred embodiment of Reaction Scheme I, i.e., the preparation of dihydroquinidine and dihydroquinine, and is carried out utilizing the reaction conditions set forth for Reaction Scheme I. In Reaction Scheme Ia, dihydroquinotoxine of Formula IIIa, antipode or racemate thereof, is converted to N-chloro-dihydroquinotoxine of Formula IVa, antipode or racemate thereof. The N-chloro-dihydroquinotoxine of Formula IVa, antipode or racemate thereof, is converted to the epimeric dihydroquinidinone of Formula Va, antipode or racemate thereof, and dihydroquininone of Formula VIa, antipode or racemate thereof, which are in turn converted to dihydroquinidine of Formula Ia, antipode or racemate thereof, and dihydroquinine of Formula IIa, antipode or racemate thereof, respectively.

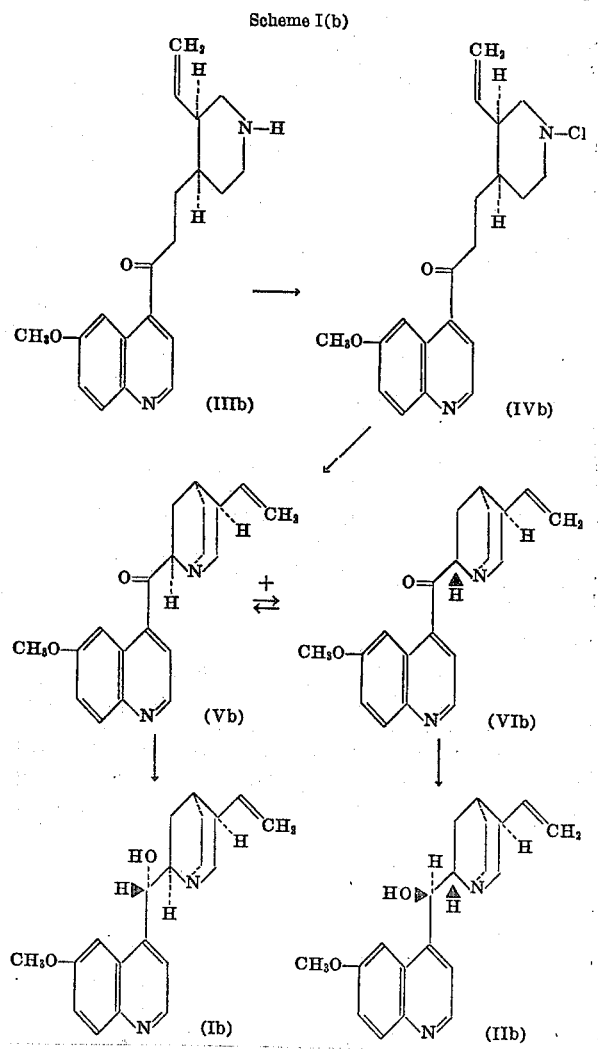

Scheme I(b)

Reaction Scheme Ib represents another preferred embodiment of Reaction Scheme I, i.e., the preparation of quinidine and quinine, antipodes or racemates thereof, and is carried out utilizing the reaction conditions set forth in Reaction Scheme I. In Reaction Scheme Ib, quinotoxine of Formula IIIb, antipode or racemate thereof, is converted to N-chloro-quinotoxine of Formula IVb, antipode or racemate thereof. The N-chloro-quinotoxine of Formula IVb, antipode or racemate thereof, is converted to quinidinone of Formula Vb, antipode or racemate thereof, and quininone of Formula VIb, antipode or racemate thereof, which are in turn converted to quinidine of Formula Ib, antipode or racemate thereof, and quinine of Formula IIb, antipode or racemate thereof, respectively.

SCHEME II

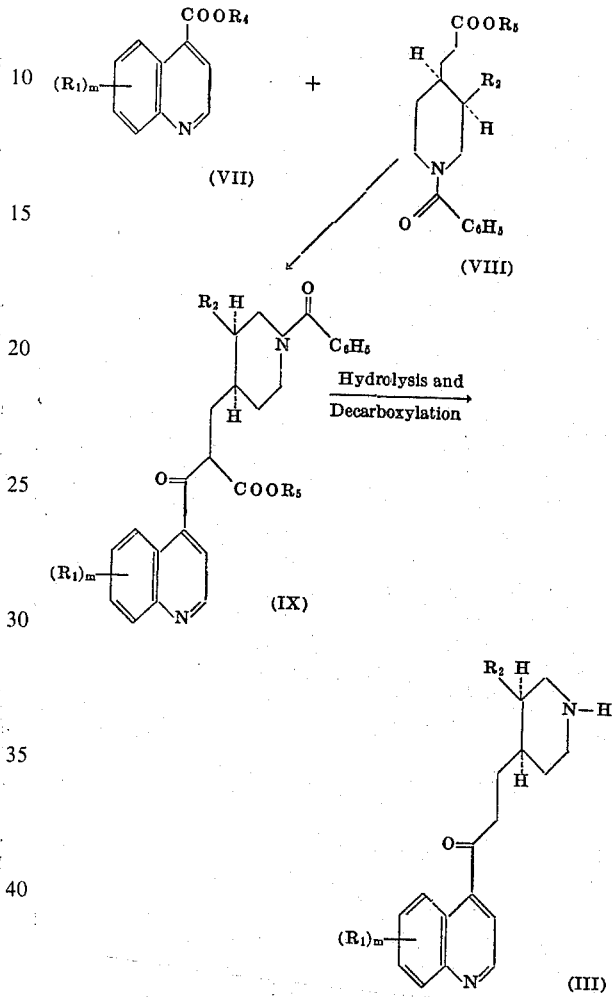

antipodes or racemates thereof
wherein $R_1$, $R_2$ and $m$ are as previously described; and $R_4$ and $R_5$ are lower alkyl.

In Reaction Scheme II, the cinchoninic acid lower alkyl esters of Formula VII, which are known or are analogs of known compounds readily obtained by known procedures, are reacted in the presence of a base, for example, alkaline metal alkoxides, such as sodium methoxide, sodium ethoxide, potassium tertiary butoxide and the like, with the 1-benzoyl-3(R)-alkyl(or alkenyl)-4(R)-piperidinepropionic acid esters of Formula VIII, antipodes or racemates thereof, which are known compounds or are analogs of known compounds readily obtained by known procedures, or by the procedure hereinafter described in Scheme III, to yield the corresponding α-[1-benzoyl-3(R)-alkyl(or alkenyl)-4(R)-piperidylmethyl]-β-oxo-4-quinolinepropionic acid esters of Formula IX, antipodes or racemates thereof. The reaction is conveniently conducted at reflux temperatures; however, lower temperatures may also be employed. An inert solvent, for example, ethers such as tetrahydrofuran, dioxane and the like, may also be conveniently employed.

The conversion of the α-[1-benzoyl-3(R)-alkyl(or alkenyl)-4(R)-piperidyl-methyl]-β-oxo-4-quinolinepropionic acid esters of Formula IX to the corresponding 4-[3-(3(R)-alkyl(or alkenyl)-4(R)-piperidyl)-1-oxopropyl]quinolines of Formula III is effected utilizing a hydrolyzing agent such as hydrochloric acid at reflux temperatures. Conveniently, temperatures below reflux may also be utilized.

The preparation of the 1-benzoyl-3(R)-alkenyl-4(R)-piperidine-propionic acid esters of Formula VIII, antipodes or racemates thereof, can be carried out as set forth in Reaction Scheme III.

SCHEME III

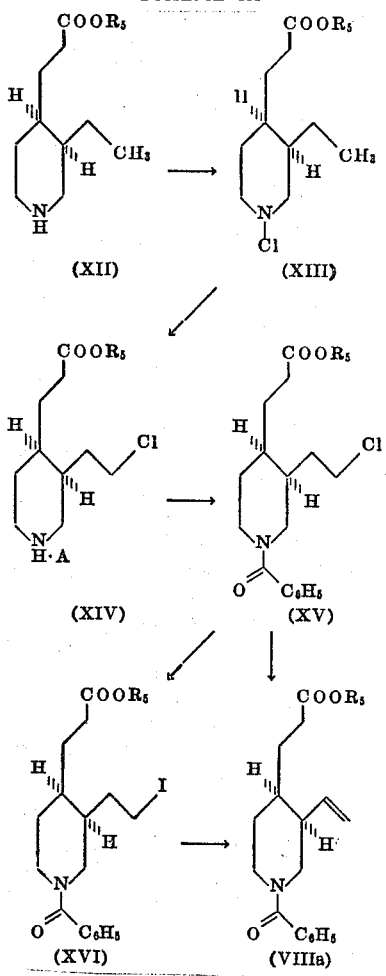

wherein $R_5$ is as previously described, and A is an inorganic acid such as sulfuric acid, phosphoric acid and the like, or organic acids, for example, lower alkanoic acids such as acetic acid, and the like, halogenated lower alkanoic acids such as trifluoroacetic acid, trichloroacetic acid and the like.

In Reaction Scheme III, the 3(R)-ethyl-4(R)-piperidinepropionic acid esters of Formula XII, antipodes or racemates thereof, which are known compounds, are converted to the corresponding 1-chloro-3(R)-ethyl-4(R)-piperidine propionic acid esters of Formula XIII, antipodes or racemates thereof, by utilizing a chlorinating agent, for example, N-chlorosuccinimide, N-chloroacetamide, alkali metal hypochlorite such as sodium hypochlorite and the like. The reaction is conducted in an inert organic solvent, for example, a hydrocarbon such as benzene, a halogenated hydrocarbon such as dichloromethane, an alkanol such as methanol, ethanol and the like, an ether such as diethylether, dioxane, tetrahydrofuran and the like. The reaction temperature is not critical; however, preferably, it is in the range of about 0°C. and about room temperature.

The conversion of the compounds of Formula XIII, their antipodes or racemates, to the corresponding 3(-R)-(2-chloroethyl)-4(R)-piperidinepropionic acid ester salts of the Formula XIV, antipodes or racemates thereof, is effected by irridiation with ultraviolet light source such as a 200W-Hannovia high pressure mercury lamp in an acid such as previously described. The reaction temperature is not critical; however, preferably it is in the range of about 0°C. to about room temperature.

The conversion of the compounds of Formula XIV, antipodes or racemates thereof, to corresponding 1-benzoyl-3(R)-(2-chloroethyl)-4(R)-piperidinepropionic acid esters of Formula XV, antipodes or racemates thereof, is effected utilizing a benzoyl halide such as benzoyl chloride, in an inert organic solvent, for example, a hydrocarbon such as benzene, toluene and the like, a halogenated hydrocarbon such as dichloromethane, chloroform and the like, or ethers such as diethyl ethers, tetrahydrofuran, dioxane and the like. The pH of the reaction mixture is maintained between about 6 to about 9 utilizing, for example, alkali metal carbonates such as sodium or potassium carbonate. The reaction temperature is not critical; however, preferably it is in the range of about 0°C. and about room temperature.

The conversion of the compounds of Formula XV, antipodes or racemates thereof, to the corresponding 1-benzoyl-3(R)-(2-iodoethyl)-4(R)-piperidinepropionic acid esters of the Formula XVI, antipodes or racemates thereof, is effected utilizing an alkali metal iodide such as potassium iodide, sodium iodide and the like, in an inert organic solvent, for example, dimethylsulfoxide, dimethylformamide, acetonitrile, alkanols such as methanol, ethanol and the like, or ketones such as acetone, methylethylketone and the like. The temperature is not critical; however, preferably it is in the range of about 0°C. and about the reflux of the reaction mixture.

The conversion of the compounds of Formula XVI, antipodes or racemates thereof, to the corresponding 1-benzoyl-3(R)-vinyl-4(R)-piperidinepropionic acid esters of the Formula VIIIa, antipodes or racemates thereof, is effected utilizing an organic base, for example, pyridine, β-collidine, dimethylformamide and the like. Advantageously, an inorganic salt, for example, lithium bromide, lithium chloride, lithium carbonate, silver fluoride, silver carbonate and the like, may be utilized in the reaction. The reaction temperature is not critical; however, preferably it is in the range of about room temperature and about the reflux temperature of the reaction mixture.

The conversion of the compounds of Formula XV, antipodes or racemates thereof, to the corresponding 1-benzoyl-3(R)-vinyl-4(R)-piperidinepropionic acid esters of the Formula VIIIa, antipodes or racemates thereof, is effected by pyrrolysis, preferably at a temperature in the range of 150°C. and about 250°C. The reaction can be conducted at atmospheric pressure; however, preferably is conducted at reduced pressure, for example, in the range of about 0.1 mm/Hg to 0.01 mm/Hg.

In still another aspect, the invention comprises the process illustrated by Reaction Scheme VI:

Scheme VI

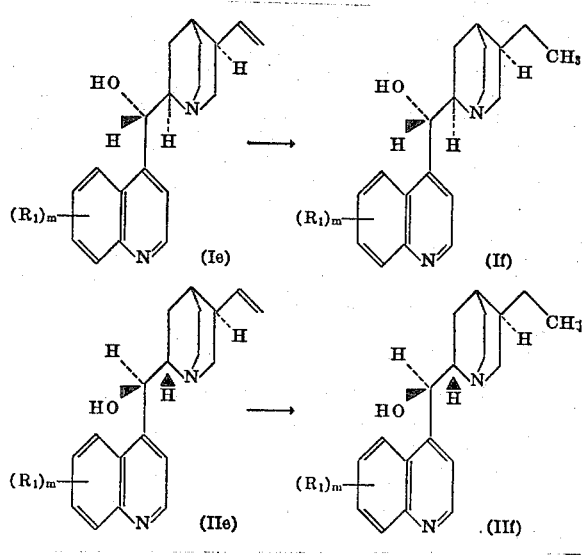

wherein $R_1$ and $m$ are as previously described.

In Reaction Scheme VI the conversion of the α(S)-[5(R)-vinyl-4(S)-quinuclidin-2(R)-yl]-4-quinolinemethanols of formula Ie or of the α(R)-[5(R)-vinyl-4(S)-quinuclidin-2(S)-yl]-4-quinolinemethanols of formula IIe to the α(S)-[5(R)-ethyl-4(S)-quinuclidin-2(R)-yl]-4-quinolinemethanols of formula If or to the α(R)-[5(R)-ethyl-4(S)-quinuclidin-2(S)-yl]-4-quinolinemethanols of formula IIf, respectively, is effected by catalytic hydrogenation utilizing, for example, a noble metal, such as palladium, platinum or the like. Conveniently, the hydrogenation is carried out in an inert solvent, for example, in water, an alkanol, such as methanol, ethanol or the like, or an organic or inorganic acid, such as acetic acid, hydrochloric acid or the like, or mixtures thereof. Further, the hydrogenation is suitably carried out at room temperature; however, temperatures above or below room temperature may be employed. Alternatively, the conversion can be effected by a chemical reduction in the presence of oxygen, utilizing hydrazine hydrate and a cupric salt, such as cupric sulfate, as the catalytic agent. Conveniently, the reduction is carried out in a polar solvent, for example, water or a lower alkanol, such as methanol or ethanol, preferably at a temperature in the range of room temperature and the boiling temperature of the reaction mixture.

In another aspect, the invention relates to compounds of the formulas

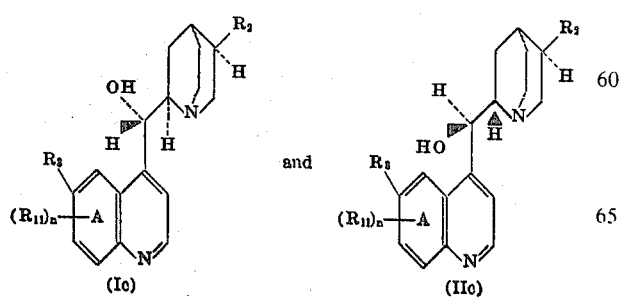

wherein $n$ is 1 or 2; $R_2$ is lower alkyl or lower alkenyl; $R_{11}$ is hydrogen, hydroxy, lower alkyl, lower alkoxy, trifluoromethyl or halogen, or, when $n$ is 2, $R_{11}$ taken together with an adjacent $R_{11}$ is also methylenedioxy; when $R_{11}$ is hydrogen, $R_3$ is lower alkyl, trifluoromethyl or halogen; when $R_{11}$ is other than hydrogen and $n$ is 1, $R_3$ is lower alkoxy, lower alkyl, hydrogen, trifluoromethyl or halogen, or taken together with an adjacent $R_{11}$ is also methylenedioxy; and when $R_{11}$ is other than hydrogen and $n$ is 2, $R_3$ is hydrogen, and pharmaceutically acceptable acid addition salts thereof.

Exemplary of the compounds of Formulas Ic and IIc are: 7-Methoxy-α(S)-[5(R)-ethyl-4(S)-quinuclidin-2(R)-yl]-4-quinolinemethanol [hereinafter referred to as 7'-methoxy-dihydrocinchonine], its antipode and racemic analog; 7-Methoxy-α(R)-[5(R)-ethyl-4(S)-quinuclidin-2(S)-yl]-4-quinolinemethanol [hereinafter referred to as 7'-methoxy-dihydrocinchonidine], its antipode and racemic analog;

6,7-Dimethoxy-α(S)-[5(R)-ethyl-4(S)-quinuclidin-2(R)-yl]-4-quinolinemethanol [hereinafter referred to as 6',7'-dimethoxy-dihydrocinchonine], its antipode and racemic analog;

6,8-Dimethoxy-α(S)-[5(R)-ethyl-4(S)-quinuclidin-2(R)-yl]-4-quinolinemethanol, its antipode and racemic analog;

6,7-Dimethoxy-α(R)-[5(R)-ethyl-4(S)-quinuclidin-2(S)-yl]-4-quinolinemethanol [hereinafter referred to as 6',7'-dimethoxy-dihydrocinchonidine], its antipode and racemic analog;

6,8-Dimethoxy-α(R)-[5(R)-ethyl-4(S)-quinuclidin-2(S)-Yl]-4-quinolinemethanol, its antipode and racemic analog;

6-Methoxy-α(S)-[5(R)-propyl-4(S)-quinuclidin-2(R)-yl]-4-quinolinemethanol, antipode and racemic analog;

6-Methoxy-α(R)-[5(R)-allyl-4(S)-quinuclidin-2(S)-yl]-4-quinolinemethanol, antipode and racemic analog;

6-Methyl-α(S)-[5(R)-ethyl-4(S)-quinuclidin-2(R)-yl]-4-quinolinemethanol [hereinafter referred to as 6'-methyldihydrocinchonine], its antipode and racemic analog;

6-Methyl-α(R)-[5(R)-ethyl-4(S)-quinuclidin-2(S)-yl]-4-quinolinemethanol [hereinafter referred to as 6'-methyldihydrocinchonidine], its antipode and racemic analog;

6-Chloro-α(S)-[5(R)-ethyl-4(S)-quinuclidin-2(R)-yl]-4-quinolinemethanol [hereinafter referred to as 6'-chloro-dihydrocinchonine], its antipode and racemic analog;

6-Chloro-α(R)-[5(R)-ethyl-4(S)-quinuclidin-2(S)-yl]-4-quinolinemethanol [hereinafter referred to as 6'-chloro-dihydrocinchonidine], its antipode and racemic analog;

7-Chloro-α(S)-[5(R)-ethyl-4(S)-quinuclidin-2(R)-yl]-4-quinolinemethanol [hereinafter referred to as 7'-chloro-dihydrocinchonine], its antipode and racemic analog;

7-Chloro-α(R)-[5(R)-ethyl-4(S)-quinuclidin-2(S)-yl]-4-quinolinemethanol [hereinafter referred to as 7'-chloro-dihydrocinchonidine], its antipode and racemic analog;

7-Chloro-α(S)-[5(R)-vinyl-4(S)-quinuclidin-2(R)-yl]-4-quinolinemethanol [hereinafter referred to as 7'-chloro-cinchonine], its antipode and racemic analog;

7-Chloro-α(R)-[5(R)-vinyl-4(S)-quinuclidin-2(S)-yl]-4-quinolinemethanol [hereinafter referred to as 7'-chloro-cinchonidine], its antipode and racemic analog;

6,7-Methylenedioxy-α(S)-[5(R)-vinyl-4(S)-quinuclidin-2(R)-yl]-4-quinolinemethanol [hereinafter referred to as 6',7'-methylenedioxy-cinchonine], its antipode and racemic analog;

6,7-Methylenedioxy-α(R)-[5(R)-vinyl-4(S)-quinuclidin-2(S)-yl]-4-quinolinemethanol [hereinafter referred to as 6',7'-methylenedioxy-cinchonidine], its antipode and racemic analog;

6-Chloro-α(S)-[5(R)-vinyl-4(S)-quinuclidin-2(R)-yl]-4-quinolinemethanol [hereinafter referred to as 6'-chloro-cinchonine], its antipode and racemic analog;

6-Chloro-α(R)-[5(R)-vinyl-4(S)-quinuclidin-2(S)-yl]-4-quinolinemethanol [hereinafter referred to as 6'-chloro-cinchonidine], its antipode and racemic analog;

6,8-Dichloro-α(S)-[5(R)-vinyl-4(S)-quinuclidin-2(R)-yl]-4-quinolinemethanol [hereinafter referred to as 6', 8'-dichloro-cinchonine], its antipode and racemic analog;

6,8-Dichloro-α(R)-[5(R)-vinyl-4(S)-quinuclidin-2(S)-yl]-4-quinolinemethanol [hereinafter referred to as 6',8'-dichloro-cinchonidine], its antipode and racemic analog;

6,7-Methylenedioxy-α(S)-[5(R)-ethyl-4(S)-quinuclidin-2(R)-yl]-4-quinolinemethanol [hereinafter referred to as 6',7'-methylenedioxy-dihydrocinchonine], its antipode and racemic analog;

6,7-Methylenedioxy-α(R)-[5(R)-ethyl-4(S)-quinuclidin-2(S)-yl]-4-quinolinemethanol [hereinafter referred to as 6',7'-methylenedioxy-dihydrocinchonidine], its antipode and racemic analog;

7-Trifluoromethyl-α(S)-[5(R)-ethyl-4(S)-quinuclidin-2(R)-yl]-4-quinolinemethanol [hereinafter referred to as 7'-trifluoromethyldihydrocinchonine], its antipode and racemic analog;

7-Trifluoromethyl-α(R)-[5(R)-ethyl-4(S)-quinuclidin-2(S)-yl]-4-quinolinemethanol [hereinafter referred to as 7'-trifluoromethyldihydrocinchonidine], its antipode and racemic analog;

6,8-Dichloro-α(S)-[5(R)-ethyl-4(S)-quinuclidin-2(R)-yl]-4-quinolinemethanol [hereinafter referred to as 6',8'-dichlorodihydrocinchonine], its antipode and racemic analog;

6,8-Dichloro-α(R)-[5(R)-ethyl-4(S)-quinuclidin-2(S)-yl]-4-quinolinemethanol [hereinafter referred to as 6',8'-dichlorodihydrocinchonidine], its antipode and racemic analog.

7-Trifluoromethyl-α(S)-[5(R)-vinyl-4(S)-quinuclidin-2(R)-yl]-4-quinolinemethanol [hereinafter referred to as 7'-trifluoromethylcinchonine], its antipode and racemic analog;

7-Trifluoromethyl-α(R)-[5(R)-vinyl-4(S)-quinuclidin-2(S)-yl]-4-quinolinemethanol [hereinafter referred to as 7'-trifluoromethylcinchonidine], its antipode and racemic analog;

5-Trifluoromethyl-α(S)-[5(R)-vinyl-4(S)-quinuclidin-2(R)-yl]-4-quinolinemethanol [hereinafter referred to as 5'-trifluoromethylcinchonine], its antipode and racemic analog;

5-Trifluoromethyl-α(R)-[5(R)-vinyl-4(S)-quinuclidin-2(S)-yl]-4-quinolinemethanol [hereinafter referred to as 5'-trifluoromethylcinchonidine], its antipode and racemic analog;

6-Trifluoromethyl-α(S)-[5(R)-vinyl-4(S)-quinuclidin-2(R)-yl]-4-quinolinemethanol [hereinafter referred to as 6'-trifluoromethylcinchonine], its antipode and racemic analog;

6-Trifluoromethyl-α(R)-[5(R)-vinyl-4(S)-quinuclidin-2(S)-yl]-4-quinolinemethanol [hereinafter referred to as 6'-trifluoromethylcinchonidine], its antipode and racemic analog.

In a further aspect, the invention relates to compounds of the formulas wherein $R_2$, $R_3$, $R_{11}$ and $n$ are as previously described, and pharmaceutically acceptable acid addition salts thereof.

Exemplary of the compounds of Formulas Vc and VIc are:

7-Methoxy-4-[5(R)-ethyl-4(S)-quinuclidin-2(R)-ylcarbonyl]-quinoline [hereinafter referred to as 7'-methoxydihydrocinchoninone], its antipode and racemic analog;

7-Methoxy-4-[5(R)-ethyl-4(S)-quinuclidin-2(S)-ylcarbonyl]-quinoline [hereinafter referred to as 7'-methoxydihydrocinchonidinone], its antipode and racemic analog;

6,7-Dimethoxy-4-[5(R)-ethyl-4(S)-quinuclidin-2(R)-yl-carbonyl]quinoline [hereinafter referred to as 6',7'-dimethoxy-dihydrocinchoninone], its antipode and racemic analog;

6,8-Dimethoxy-4-[5(R)-ethyl-4(S)-quinuclidin-2(R)-yl-carbonyl]quinoline, its antipode and racemic analog;

6,7-Dimethoxy-4-[5(R)-ethyl-4(S)-quinuclidin-2(S)-yl-carbonyl]quinoline [hereinafter referred to as 6',7'-dimethoxy-dihydrocinchonidinone], its antipode and racemic analog;

6,8-Dimethoxy-4-[5(R)-ethyl-4(S)-quinuclidin-2(S)-yl-carbonyl]quinoline, its antipode and racemic analog;

6-Methyl-4-[5(R)-ethyl-4(S)-quinuclidin-2(R)-ylcarbonyl]-quinoline [hereinafter referred to as 6'-methyldihydrocinchoninone], its antipode and racemic analog;

6-Methyl-4-[5(R)-ethyl-4(S)-quinuclidin-2(S)-ylcarbonyl]-quinoline [hereinafter referred to as 6'-methyldihydrocinchonidinone], its antipode and racemic analog;

6-Chloro-4-[5(R)-ethyl-4(S)-quinuclidin-2(R)-ylcarbonyl]-quinoline [hereinafter referred to as 6'-chlorodihydrocinchoninone], its antipode and racemic analog;

6-Chloro-4-[5(R)-ethyl-4(S)-quinuclidin-2(S)-ylcarbonyl]-quinoline [hereinafter referred to as 6'-chlorodihydrocinchonidinone], its antipode and racemic analog;

7-Chloro-4-[5(R)-ethyl-4(S)-quinuclidin-2(R)-ylcarbonyl]-quinoline [hereinafter referred to as 7'-chlorodihydrocinchoninone], its antipode and racemic analog;

7-Chloro-4-[5(R)-ethyl-4(S)-quinuclidin-2(S)-ylcarbonyl]-quinoline [hereinafter referred to as 7'-chlorodihydrocinchonidinone], its antipode and racemic analog;

7-Chloro-4-[5(R)-vinyl-4(S)-quinuclidin-2(R)-ylcarbonyl]-quinoline [hereinafter referred to as 7'-chlorocinchoninone], its antipode and racemic analog;

7-Chloro-4-[5(R)-vinyl-4(S)-quinuclidin-2(S)-ylcarbonyl]-quinoline [hereinafter referred to as 7'-chlorocinchonidinone], its antipode and racemic analog; and the like.

6,7-Methylenedioxy-4-[5(R)-vinyl-4(S)-quinuclidin-2(R)-yl carbonyl]-quinoline [hereinafter referred to as 6',7'-methylenedioxy-cinchoninone]its antipode and racemic analog;

6,7-Methylenedioxy-4-[5(R)-vinyl-4(S)-quinuclidin-2(S)-yl carbonyl]-quinoline [hereinafter referred to as 6',7'-methylenedioxy-cinchonidinone] its antipode and racemic analog;

6,7-Methylenedioxy-4-[5(R)-ethyl-4(S)-quinuclidin-2(R)-yl carbonyl]-quinoline [hereinafter referred to as 6',7'-methylenedioxy-dihydrocinchoninone], its antipode and racemic analog;

6,7-Methylenedioxy-4[5(R)-ethyl-4(S)-quinuclidin-2(S)-yl carbonyl]-quinoline [hereinafter referred to as 6', 7'-methylenedioxydihydrocinchonidinone], its antipode and racemic analog;

6,8-Dichloro-4-[5(R)-ethyl-4(S)-quinuclidin-2(R)-yl carbonyl]-quinoline [hereinafter referred to as 6',8'-dichloro-dihydrocinchoninone], its antipode and racemic analog;

6,8-Dichloro-4-[5(R)-ethyl-4(S)-quinuclidin-2(S)-yl carbonyl]-quinoline [hereinafter referred to as 6',8'-dichlorodihydrocinchonidinone], its antipode and racemic analog;

6-Chloro-4-[5(R)-vinyl-4(S)-quinuclidin-2(R)-ylcarbonyl]-quinoline [hereinafter referred to as 6'-chlorocinchoninone], its antipode and racemic analog;

6-Chloro-4-[5(R)-vinyl-4(S)-quinuclidin-2(S)-ylcarbonyl]-quinoline [hereinafter referred to as 6'-chlorocinchonidinone], its antipode and racemic analog;

7-Trifluoromethyl-4-[5(R)-ethyl-4(S)-quinuclidin-2(S)-ylcarbonyl]-quinoline [hereinafter referred to as 7'-trifluoromethyl-dihydrocinchonidinone], its antipode and racemic analog;

7-Trifluoromethyl-4-[5(R)-ethyl-4(S)-quinuclidin-2(R)-ylcarbonyl]-quinoline [hereinafter referred to as 7'-trifluoromethyl-dihydrocinchoninone], its antipode and racemic analog;

6,8-Dichloro-4-[5(R)-vinyl-4(S)-quinuclidin-2(R)-ylcarbonyl]-quinoline [hereinafter referred to as 6',8'-dichlorocinchoninone], its antipode and racemic analog;

6,8-Dichloro-4-[(R)-vinyl-4(S)-quinuclidin-2(S)-ylcarbonyl]-quinoline [hereinafter referred to as 6',8'-dichlorocinchonidinone], its antipode and racemic analog.

In a still further aspect, the invention relates to compounds of the formulas

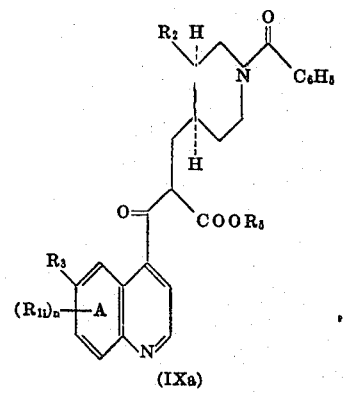

(IXa)

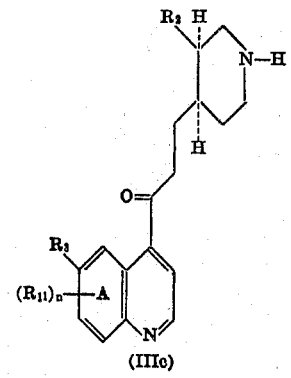

(IIIc)

and

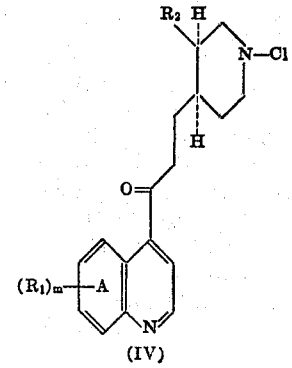

(IV)

wherein $R_1$, $R_2$, $R_3$, $R_5$, $R_{11}$, $m$ and $n$ are as previously described.

Exemplary of the compounds of Formulas IXa, IIIc and IV are:

α-[1-Benzoyl-3(R)-vinyl-4(R)-piperidyl-methyl]-β-oxo-β-(6,7-methylenedioxy-4-quinolyl)propionic acid ethyl ester, its antipode and racemic analog;

α-[1-Benzoyl-3(R)-ethyl-4(R)-piperidylmethyl]-β-oxo-β-(7-methoxy-4-quinolyl)propionic acid ethyl ester, its antipode and racemic analog;

α-[1-Benzoyl-3(R)-ethyl-4(R)-piperidylmethyl]-β-oxo-β-(6,7-dimethoxy-4-quinolyl)propionic acid ethyl ester, its antipode and racemic analog;

α-[1-Benzoyl-3(R)-ethyl-4(R)-piperidylmethyl]-β-oxo-β-(6,8-dimethoxy-4-quinolyl)propionic acid ethyl ester, its antipode and racemic analog;

β-[1-Benzoyl-3(R)-ethyl-4(R)-piperidylmethyl]-β-oxo-β-(6-methyl-4-quinolyl)propionic acid ethyl ester, its antipode and racemic analog;

α-[1-Benzoyl-3(R)-ethyl-4(R)-piperidylmethyl]-β-oxo-β-(6-chloro4-quinolyl)propionic acid ethyl ester, its antipode and racemic analog;

α-[1-Benzoyl-3(R)-ethyl-4(R)-piperidylmethyl]-β-oxo-β-(7-chloro-4-quinolyl)propionic acid ethyl ester, its antipode and racemic analog;

α-[1-Benzoyl-3(R)-vinyl-4(R)-piperidylmethyl]-β-oxo-β-(7-chloro-4-quinolyl)propionic acid ethyl ester, its antipode and racemic analog;

7-Methoxy-4-[3-(3(R)-ethyl-4(R)-piperidyl)-1-oxopropyl]-quinoline [hereinafter referred to as 7'-methoxy-dihydrocinchotoxine], its antipode and racemic analog;

6,7-Dimethoxy-4-[3-(3(R)-ethyl-4-(R)-piperidyl)-1-oxopropyl]-quinoline [hereinafter referred to as 6',7'-dimethoxydihydrocinchotoxine], its antipode and racemic analog;

6,8-Dimethoxy-4-[3-(3(R)-ethyl-4(R)-piperidyl)-1-oxopropyl]-quinoline, its antipode and racemic analog;

6-Methyl-4-[3-(3(R)-ethyl-4(R)-piperidyl)-1-oxopropyl]-quinoline [hereinafter referred to as 6'-methyl-dihydrocinchotoxine], its antipode and racemic analog;

6-Chloro-4-[3-(3R)-ethyl-4(R)-piperidyl)-1-oxopropyl]quinoline [hereinafter referred to as 6'-chlorodihydrocinchotoxine], its antipode and racemic analog;

7-Chloro-4-[3(3R)-ethyl-4(R)-piperidyl)-1-oxopropyl]-quinoline [hereinafter referred to as 7'-chloro-dihydrocinchotoxine], its antipode and racemic analog;

7-Chloro-4-[3-(3R)-vinyl-4(R)-piperidyl)-1-oxopropyl]-quinoline [hereinafter referred to as 7'-chlorocinchotoxine], its antipode and racemic analog;

6,7-Methylenedioxy-4-[3-(3R)-vinyl-4(R)-piperidyl-1-oxopropyl]-quinoline [hereinafter referred to as 6',7'-methylenedioxycinchotoxine], its antipode and racemic analog;

6-Methoxy-4-[3-(1-chloro-3(R)-ethyl-4(R)-piperidyl)-1-oxopropyl]quinoline [hereinafter referred to as N-chlorodihydroquinotoxine], its antipode and racemic analog;

7-Methoxy-4-[3-(1-chloro-3(R)-ethyl-4(R)-piperidyl)-1-oxopropyl]quinoline [hereinafter referred to as N-chloro-7'-methoxy-dihydrocinchotoxine], its antipode and racemic analog;

6-Methoxy-4-[3-(1-chloro-3(R)-vinyl-4(R)-piperidyl)-1-oxopropyl]quinoline [hereinafter referred to as N-chloroquinotoxine], its antipode and racemic analog;

6,7-Dimethoxy-4-[3-(1-chloro-3(R)-ethyl-4(R)-piperidyl)-1-oxopropyl]quinoline [hereinafter referred to as N-chloro-6',7'-dimethoxy-dihydrocinchotoxine], its antipode and racemic analog;

6,8-Dimethoxy-4-[3-(1-chloro-3(R)-ethyl-4(R)-piperidyl)-1-oxopropyl]quinoline, its antipode and racemic analog;

6-Methyl-4-[3-(1-chloro-3(R)-ethyl-4(R)-piperidyl)-1oxopropyl]quinoline [hereinafter referred to as N-chloro-6'-methyl-dihydrocinchotoxine], its antipode and racemic analog;

6,7-Methylenedioxy-4-[3-(1-chloro-3(R)-vinyl-4(R)-piperidyl)-1-oxo-propyl]quinoline [hereinafter referred to as N-chloro-6,7-methylenedioxyquinotoxine], its antipode and racemic analog;

6-Chloro-4-[3-(1-chloro-3(R)-ethyl-4(R)-piperidyl)-1-oxopropyl]quinoline [hereinafter referred to as N-chloro-6'-chloro-dihydrocinchotoxine], its antipode and racemic analog;

7-Chloro-4-[3-(1-chloro-3(R)-vinyl-4(R)-piperidyl)-1-oxopropyl]quinoline [hereinafter referred to as N-chloro-7'-chloro-cinchotoxine], its antipode and racemic analog;

7-Chloro-4-[3-(1-chloro-3(R)-ethyl-4-(R)-piperidyl)-1-oxopropyl]-quinoline [hereinafter referred to as N-chloro-7'-chloro-dihydrocinchotoxine], its antipode and racemic analog.

Preferred compounds of Formulas Ic, IIc, IIIc, Vc, VIc and IXa are those wherein the fused benzo ring (hereinafter referred to as ring A) is substituted thusly:

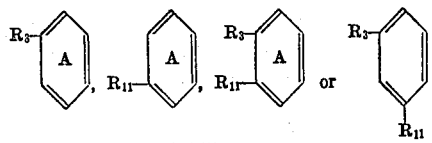

Preferred compounds of Formula IV are those wherein ring A is

Also included in the purview of the invention are compounds of Formulas Ic, IIc, Vc, VIc, IXa and IIIc, wherein $R_{11}$ is hydrogen; $R_3$ is methoxy; and $R_2$ is selected from the group consisting of methyl, $C_3$–$C_7$ lower alkyl and $C_3$–$C_7$ lower alkenyl. Respectively, these compounds have the same utility as the compounds of Formulas Ic, IIc, Vc, VIc, IXa and IIIc.

The corresponding compounds of Formulas Ic and IIc above are characterized by the formulas

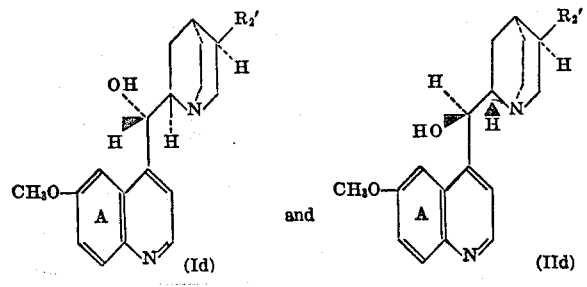

wherein $R_2'$ is selected from the group consisting of methyl, $C_3$–$C_7$ lower alkyl and $C_3$–$C_7$ lower alkenyl, the corresponding compounds of the Formulas Vc, VIc, IXa and IIIc wherein $R_{11}$ is hydrogen; $R_3$ is methoxy; $R_2$ is methyl $C_3$–$C_7$-lower alkyl and $C_3$–$C_7$ lower alkenyl can be similarly characterized, and pharmaceutically acceptable acid addition salts thereof.

Exemplary of such compounds are 6-methoxy-α(S)-[5(R)-propyl-4(S)-quinuclidin-2(R)-yl]-4-quinolinemethanol and racemic analog; 6-methoxy-α(R)-[5-allyl-4(S)-quinuclidin-2(S)-yl]-4-quinolinemethanol and racemic analog; and the like.

The compounds of Formulas Ic, IIc, Id, IId, Vc and VIc and their pharmaceutically acceptable acid addition salts possess antimalarial and antiarrhythmic properties and are therefore useful as antimalarial and antiarrhythmic agents. Their pharmacologically useful antiarrhythmic activity is demonstrated in warm-blooded animals utilizing standard procedures, for example, the test compound is administered to prepared mongrel dogs. The chest cavity of the experimental animal previously anesthetized using a combination of sodium barbitol, 300 mg/kg. and pentobarbitol, 15 mg/kg., i.v., is opened up through the third right interspace under artificial respiration and the pericardium is cut and sutured to the wall of the thorax so as to maintain the heart in a pericardial cradle throughout the course of the test procedure. Arterial pressure is monitored by inserting a polyethylene cannula into the aorta via the left carotid artery and is measured with an appropriate Statham pressure transducer. During the course of the experiment, electrical activity of the heart is viewed both on an oscilloscope and recorded on a Sanborn polyviso using standard ECG lead II. The heart is also observed visually. The antiarrhythmic assay of the test drug is undertaken using a modification of the method of Scherf and Chick, Circulation, 3, 764–769 (1951). A dripping of 1 percent solution of acetylcholine is applied to the sinus node and the atrium is irritated by pinching with a pair of forceps. This procedure produces a continuous atrial arrhythmia which mostly consists of atrial fibrillation. Since hypokalemia produces a susceptibility to atrial fibrillation (Leveque, Arch. Int. Pharmacodyn, 149, 297–307, 1964), 2 units/kg. of insulin is administered 30 minutes before the start of the acetylcholine drip. Once atrial fibrillation is established, there is a 10-minute waiting period before the test drug is administered. The test drugs are administered intravenously at the rate of 1 mg/kg/minute until normal sinus rhythm appears or until 30 mg/kg. of drug is administered.

When racemic 7'-methoxy-dihydrocinchonidinone is utilized as the test substance at a dosage of about 4.4 mg/kg., i.v., an antifibrillatory effect is observed for more than 60 minutes.

The pharmacologically useful antimalarial activity of the aforementioned compounds is demonstrated in warm-blooded animals using standard procedures, for example, the test substance is administered to albino mice in variable amounts. Albino mice are inoculated with about 10 million red cells infected with P. Bergei. Treatment is started on the first day after inoculation, and the drug is administered "per os" during 4 consecutive days. On the seventh day of infection, smears are made, stained with giemsa and microscopically examined for P. Berghei.

When racemic 7'-methoxy-dihydrocinchonidine dihydrochloride and racemic 7'-methoxy-dihydrocinchonine dihydrochloride are utilized as the test substance at dosages in the range of 125 mg/kg. to about 250 mg/kg., the microscopical examination of the blood smears is free of P. Berghei (negative). The compounds of Formulas Ic, IIc, Vc and VIc and the pharmaceutically acceptable acid addition salts have effects qualitatively similar, for example, to those of quinine and quinidine of known therapeutic uses and properties. Thus, the compounds of the invention demonstrate a pattern of activity associated with antimalarials and antiarrhythmics of known efficacy and safety.

The compounds of Formulas Ic, IIc, Id, IId, Vc, and VIc form acid addition salts and such salts are also within the scope of this invention. Thus, the aforementioned compounds form pharmaceutically acceptable addition salts with, for example, both pharmaceutically acceptable organic and inorganic acids, such as acetic acid, succinic acid, formic acid, methanesulfonic acid, p-toluene-sulfonic acid, hydrochloric acid, nitric acid, phosphoric acid, sulfuric acid and the like.

The products of the invention can be incorporated into standard pharmaceutical dosage forms, for example, they are useful for oral or parenteral application with the usual pharmaceutical adjuvant materials, e.g., organic or inorganaic inert carrier materials such as water, gelatin, lactose, starch, magnesium stearate, talc, vegetable oils, gums, polyalkyleneglycols, and the like. The pharmaceutical preparations can be employed in a solid form, e.g., as tablets, troches, suppositories, capsules, or in liquid form, e.g., as solutions, suspensions or emulsions. The pharmaceutical adjuvant material can include preservatives, stabilizers, wetting or emulsifying agents, salts to change the osmotic pressure or to act as buffers. They can also contain other therapeutically active materials.

Furthermore, the compounds of the Formulas Ic, IIc, Id and IId can be utilized as flavoring agents in beverages in the same manner as quinine is now used for this purpose.

The quantity of active medicament which is present in any of the above-described dosage forms is variable. The frequency with which any such dosage form will be administered will vary, depending upon the quantity of active medicament present therein and the needs and requirements of the pharmacological situation.

Due to the possible different spatial arrangements of their atoms, it is to be understood that the compounds of this invention may be obtained in more than one possible stereoisomeric form. The novel compounds, as described and claimed, are intended to embrace all such isomeric forms. Accordingly, the examples included herein are to be understood as illustrative of particular mixtures of isomers or single isomers and not as limitations upon the scope of the invention. All temperatures are in degrees centigrade, unless otherwise mentioned.

EXAMPLE 1

Preparation of Dihydroquinidinone

To a solution containing 1.5 g. of dihydroquinotoxine in 120 ml. of methylene chloride were added 2.5 ml. of 17 percent aqueous NaOCl solution and the mixture was stirred 16 hours at 20°, under nitrogen. The organic phase was separated, washed once with water, dried over anhydrous sodium sulfate, and evaporated. The crude N-chloro-dihydroquinotoxine (1.65 g.) was dissolved in 10 ml. of methylene chloride and added dropwise to 80 ml. of 100 percent phosphoric acid which was stirred vigorously; the viscous mixture was stirred at 20° for 4 hours. The mixture was cooled and made alkaline to a pH ≈ 10 with 6N aqueous sodium hydroxide; the alkaline aqueous phase was extracted thoroughly with chloroform, which was dried over anhydrous sodium sulfate, and evaporated to dryness. The crude product (1.49 g.) was chromatographed on a column of 50 g. of neutral alumina, activity II; elution with methylene chloride yielded 1.1 g. (73 percent) of an amorphous mixture of dihydroquinidinone and dihydroquininone which was crystallized from ethanol to yield 930 mg. of dihydroquinidinone having a melting point of 102°–104° after recrystallization from ether; $[\alpha]_D^{25} + 71°$ (c 1.1, ethanol; after equilibration in ethanolic solution for 18 hours at 20°).

EXAMPLE 2

Preparation of Racemic dihydroquininone and racemic dihydroquinidinone from racemic dihydroquinotoxine To a solution containing 14.8 g. of racemic dihydroquinotoxine in 100 ml. of chloroform were added 26 ml. of 17 percent aqueous sodium hypochlorite solution, and the mixture was agitated under nitrogen at 20° for 16 hours. The aqueous phase was separated and washed with methylene chloride. The organic phases were combined, washed with water, dried over anhydrous sodium sulfate and evaporated to dryness.

The crude racemic N-chloro-dihydroquinotoxine (about 15 g.) was dissolved in about 20 ml. of methylene chloride and the concentrated solution was added dropwise to 120 ml. of 100 percent phosphoric acid which was cooled in an ice-bath and vigorously stirred for 4 hours; the cooled solution was made alkaline with 6N aqueous sodium hydroxide and extracted thoroughly with ether. The ethereal phase was dried over anhydrous potassium carbonate and evaporated to dryness.

The crude product (14 g.) was chromatographed on 500 g. of alumina, activity II. Elution with methylene chloride containing 0 to 1 percent of methanol yielded 10.1 g. of pure, crystalline mixture of racemic dihydroquininone and racemic dihydroquinidinone (68 percent yield from dihydroquinotoxine). Crystallization from petroleum ether yielded 8.09 g. of crystals in three crops. The first crop having a melting point of 89°–95° was recrystallized four times from petroleum ether to yield racemic dihydroquininone having a melting point of 100°–104°.

Recrystallization of the third crop having a melting point of 80°–82°, from petroleum ether yielded about a 1:1 mixture of racemic dihydroquininone and racemic dihydroquinidinone having a melting point of 80°–83°.

EXAMPLE 3

Preparation of Quinidinone from Quinotoxine

To a solution containing 1.804 g. of quinotoxine in 35 ml. of methylene chloride were added 6.4 ml. of about a 17 percent aqueous sodium hypochlorite solution, and the mixture was stirred under nitrogen for 2½ hours at 20°. The organic layer was separated, washed with water, dried over anhydrous sodium sulfate and evaporated to dryness. The crude N-chloroquinotoxine (1.927 g.) was dissolved in about 6 ml. of methylene chlorideacetic acid 4:1 and added dropwise with stirring to 10 ml. of 99.5 percent phosphoric acid. The resulting viscous mixture was stirred at 0°–20° for 2 hours. The reaction mixture was poured into 50 ml. of water. The aqueous phase was made alkaline with 6N sodium hydroxide and the temperature was allowed to rise to about 40°. After 10 minutes, the aqueous alkaline phase was extracted thoroughly with methylene chloride; the organic phase was washed with water, dried over anhydrous sodium sulfate, and evaporated to dryness. The crude product (1.714 g.) was chromatographed through 17 g. of neutral alumina, activity II; elution with methylene chloride yielded 1.178 g. (66 percent) of a mixture of quinidinone and quininone. Crystallization from ether yielded 915 mg. (51 percent) of quinidinone which after recrystallization from ether had a melting point of 98°–101°; $[\alpha]_D^{25} + 72.6°$ (c 0.99, ethanol; after equilibration in ethanolic solution for 18 hours at 20°).

EXAMPLE 4

Preparation of Racemic 7'-Methoxy-dihydrocinchotoxine from cis 1-benzoyl-3-ethyl-4-piperidinepropionic acid ethyl ester and 7-methoxy-4-carbethoxy-quinoline A solution containing 25.4 g. of cis 1-benzoyl-3-ethyl-4-piperidinepropionic acid ethyl ester in 250 ml. of dry tetrahydrofuran was added dropwise (30 min.) to a gently refluxing mixture of 26.9 g. of potassium t-butoxide and 25.8 g. of 7-methoxy-4-carbethoxyquinoline in 400 ml. of dry tetrahydrofuran, in an atmosphere of dry nitrogen. The mixture was heated under gentle reflux for two hours, and the solvent was removed under reduced pressure. The residue was dissolved in 300 ml. of 0.5N sodium hydroxide, and was washed with benzene. The alkaline aqueous phase containing α-cis(1-benzoyl-3-ethyl-4-piperidylmethyl)-β-oxo-β-(7-methoxy-4-quinolyl)propionic acid ethyl ester was acidified so that a 6N aqueous hydrochloric acid solution was obtained, and the solution was heated under reflux for 21 hours. The cooled reaction mixture was made alkaline with 6N sodium hydroxide, and extracted thoroughly with ether. The ethereal extracts were dried over anhydrous potassium carbonate and concentrated to dryness.

The crude product (21.0 g.) was dissolved in a small volume of acetone and added to a solution containing 14.5 g. of dibenzoyl-d-tartaric acid in acetone. The precipitate was separated by filtration, the free bases of the mother liquors were purified by preparative tlc to yield racemic 7'-methoxy-dihydrocinchotoxine. A sample of the neutral dibenzoyl-d-tartarate was recrystallized from methanol and had a melting point of 174°–175.5°. The free base dl-7'-methoxy-dihydrocinchotoxine was obtained as a yellow oil.

EXAMPLE 5

Preparation of 7'-Methoxy-dihydrocinchotoxine from N-benzoyl-homocincholoipone ethyl ester and 7-methoxy-4-carbethoxy quinoline A solution containing 4.14 g. of N-benzoylhomocincholoipone ethyl ester in 40 ml. of dry tetrahydrofuran was added dropwise (20 min.) to a gently refluxing mixture of 4.98 g. of potassium t-butoxide and 4.74 g. of 7-methoxy-4-carbethoxyquinoline in 90 ml. of dry tetrahydrofuran in an atmosphere of dry nitrogen. The mixture was heated under gentle reflux for three hours, then the solvent was removed by distillation under vacuum, and the cooled residue dissolved in 100 ml. of 0.5N sodium hydroxide. The alkaline phase was washed with benzene and the benzene phases washed with 0.5N sodium hydroxide. The combined aqueous phases containing α-[1-benzoyl-3(R)-ethyl-4(R)piperidylmethyl]-β-oxo-β-(7-methoxy-4-quinolyl) propionic acid ethyl ester were acidified so that a 6N hydrochloric acid solution was obtained, and then heated under gentle reflux for 17 hours. The cooled reaction mixture was made alkaline with 6N sodium hydroxide and thoroughly extracted with ether. The ethereal extracts were dried over anhydrous potassium carbonate and evaporated to dryness. The crude product (3.30 g.) was dissolved in a small volume of acetone, and 1.7 g. of dibenzoyl-d-tartaric acid as a concentrated solution in acetone was added. Crystallization yielded 4.11 g. (54 percent) of 7'-methoxy-dihydrocinchotoxine as its neutral dibenzoyl-d-tartarate; having a melting point of 177°–179° after recrystallization from chloroform-methanol; $[\alpha]_D^{26} -39.6°$ [c 0.5, ethanol-chloroform (1:2)].

EXAMPLE 6

Preparation of 7'-Methoxy-dihydrocinchoninone and 7'-methoxy-dihydrocinchonidinone from 7'-methoxy-dihydrocinchotoxine To a solution containing 2.65 g. of 7'-methoxy-dihydrocinchotoxine in 100 ml. of chloroform were added 5 ml. of about a 17 percent aqueous sodium hypochlorite solution. The resulting mixture was stirred at 20° for 16 hours. The organic phase was separated, washed with water, dried over anhydrous sodium sulfate and evaporated. The crude N-chloro-7'-methoxy-dihydrocinchotoxine was dissolved in a minimal amount of chloroform and added dropwise to 15 ml. of 100 percent phosphoric acid with vigorous stirring. The resulting viscous mixture was stirred at 20° for 4 hours. Thereafter, it was made alkaline with 6N potassium hydroxide and the temperature of the alkaline phase was allowed to reach about 40°. After 10 minutes, the aqueous phase was extracted thoroughly with ether. The ethereal phase was dried over anhydrous potassium carbonate, and concentrated to dryness. The crude product (2.49 g.) was chromatographed on a column of 75 g. of neutral alumina, activity II; elution with methylene chloride yielded 1.49 g. (56 percent) of a mixture of 7'-methoxy-dihydrocinchoninone and 7'-methoxy-dihydrocinchonidinone having a melting point of 103°–108° after recrystallization from petroleum ether, and a specific rotation of $[\alpha]_D^{25} + 16°$ (c 0.27, ethanol; after equilibration in ethanolic solution for 18 hours at 20°).

In the like manner, the following analogs can be prepared:

A mixture of 7-chloro-4-[5(R)-ethyl-4(S)-quinuclidin-2(R)-ylcarbonyl]-quinoline and 7-chloro-4-[5(R)-ethyl-4(S)-quinuclidin-2(S)-ylcarbonyl]-quinoline, which is amorphous; its antipode, which is amorphous; and racemate thereof, having a m.p. of 124°–127°;

A mixture of 7-chloro-4-[5(R)-vinyl-4(S)-quinuclidin-2(S)-ylcarbonyl]-quinoline and 7-chloro-4-[5(R)-vinyl-4(S)-quinuclidin-2(S)-ylcarbonyl]-quinoline, which is amorphous;

A mixture of racemic 7-trifluoromethyl-4[5(R)-ethyl-4(S)-quinuclidin-2(R)-ylcarbonyl]-quinoline and racemic 7-trifluoromethyl-4-[5(R)-ethyl-4(S)-quinuclidin-2(S)-ylcarbonyl]-quinoline; m.p. 106°–111°.

EXAMPLE 7

Preparation of racemic 7'-methoxy-dihydrocinchonidinone and racemic 7'-methoxy-dihydrocinchoninone from racemic 7'-methoxy-dihydrocinchotoxine To a solution containing 20.6 g. of racemic 7'-methoxy-dihydrocinchotoxine in 150 ml. of chloroform were added 55 ml. of about a 17 percent aqueous sodium hypochlorite solution, and the mixture was agitated for 16 hours at 20°. The organic phase was separated, washed with water, dried over anhydrous sodium sulfate and evaporated to dryness. The crude racemic N-chloro-7'-methoxy-dihydrocinchotoxine was dissolved in a minimum volume of chloroform and added dropwise to 150 ml. of concentrated phosphoric acid at 20° with vigorous stirring. The resulting viscous mixture was stirred for 2 hours. The solution was cooled with ice, diluted with water, and made alkaline with 6N sodium hydroxide. During neutralization, the temperature was allowed to reach about 40°. After about 10 minutes, the alkaline aqueous phase was extracted thoroughly with ether and the ethereal phase was dried over anhydrous potassium carbonate and evaporated to dryness. The crude, crystalline product (20.4 g.) was dissolved in petroleum ether, leaving an insoluble, tarry residue of 3.4 g. Crystallization from the same solvent yielded 9.49 g. of racemic 7'-methoxy-dihydrocinchonidinone and 7.52 g. of an amorphous mixture of racemic 7'-methoxy-dihydrocinchoninone and racemic 7'-methoxy-dihydrocinchonidinone (total yield 82%). After 2 recrystallizations from petroleum ether, racemic 7'-methoxy-dihydrocinchonidinone had a melting point of 115°–118°.

EXAMPLE 8

Preparation of 6',7'-Dimethoxy-dihydrocinchotoxine from 6,7-dimethoxy-4-carbethoxy quinoline and N-benzoylhomocincholoipon ethyl ester A solution containing 3.28 g. of N-benzoyl-homocincholoipon ethyl ester in 30 ml. of dry tetrahydrofuran was added dropwise (30 min.) to a gently refluxing mixture of 3.13 g. of 6,7-dimethoxy-4-carbethoxyquinoline and 3.40 g. of potassium 5-butoxide in 50 ml. of dry tetrahydrofuran in an atmosphere of dry nitrogen. The mixture was heated under reflux for an additional two hours and then the solvent was removed by distillation under reduced pressure. The cooled residue was dissolved in 75 ml. of 0.5N sodium hydroxide. The alkaline phase was washed with benzene and the benzene extracts were washed with 0.5N sodium hydroxide. The combined aqueous phase was acidified with concentrated hydrochloric acid, so that about a 6N hydrochloric acid solution was obtained, and heated under gentle reflux for 24 hours. The cold reaction mixture was made alkaline with 6N sodium hydroxide and was thoroughly extracted with ether. The ethereal extracts were dried over anhydrous potassium carbonate and evaporated to dryness. The crude product was dissolved in a small volume of acetone, and 0.805 g. of dibenzoyl-d-tartaric acid was added as a concentrated solution in acetone. Crystallization yielded 1.63 g. of 6',7'-dimethoxy-dihydrocinchotoxine neutral dibenzoyl-d-tartarate, having a melting point of 161.5°–163.5°, after three recrystallizations from methylene chloride/acetone; [$\alpha$]$_D^{25}$ −37.7° [c 1.02, chloroform-ethanol (2:1)].

EXAMPLE 9

Mixture of 6',7'-Dimethoxy-dihydrocinchoninone and 6',7'-dimethoxy-dihydrocinchonidinone from 6',7'-dimethoxy-dihydrocinchotoxine To a solution containing 1.42 g. of 6',7'-dimethoxy-dihydrocinchotoxine in 50 ml. of chloroform was added 3.5 ml. of about 17 percent aqueous sodium hypochlorite, and the mixture was stirred at 20° for 90 minutes. The organic phase was separated, washed with water, dried over anhydrous sodium sulfate and concentrated to a volume of 10 ml. The solution containing 6,7-dimethoxy-4[3-(1-chloro-3(R)-ethyl-4(R)-piperidyl)-1-oxopropyl]-quinoline was added dropwise to 10 ml. of 100 percent phosphoric acid, and the viscous mixture was stirred at 20° for 5 hours. The mixture was diluted with water, made alkaline with 6N potassium hydroxide while allowing the alkaline phase to reach about 40°, and extracted thoroughly with ether. The ethereal phase was dried over anhydrous potassium carbonate and concentrated to dryness. The crude product was purified on preparative tlc plates [chloroform-triethylamine (9:1)], to yield .794 g. of a pure, amorphous mixture (about 1:1) of 6',7'-dimethoxy-dihydrocinchoninone and 6',7'-dimethoxy-dihydrocinchonidinone.

EXAMPLE 10

Preparation of Racemic 6',7'-Dimethoxydihydrocinchotoxine from cis 1-benzoyl-3-ethyl-4-piperidinepropionic acid ethyl ester and 6,7-Dimethoxy-4-carbethoxyquinoline A solution containing 31.7 g. of cis (1-benzoyl-3-ethyl-4-piperidinepropionic acid ethyl ester in 250 ml. of dry tetrahydrofuran was added dropwise (40 min.) to a refluxing mixture of 36.5 g. of 6,7-dimethoxy-4-carbethoxy-quinoline and 33.6 g. of potassium t-butoxide in 500 ml. of dry tetrahydrofuran under an atmosphere of dry nitrogen. The mixture was heated under reflux for two hours and the solvent was removed under reduced pressure. The cold residue was dissolved in 300 ml. of 0.5N sodium hydroxide and washed with four 60 ml. portions of benzene. The combined aqueous phases containing the β-ketoester were acidified with conc. HCl, whereby a 6N hydrochloric acid solution was obtained, and then heated under reflux for 24 hours. The reaction mixture was allowed to cool, made alkaline with 6N sodium hydroxide and extracted with ether. The ethereal extracts were dried over anhydrous potassium carbonate and evaporated to dryness to give 14.5 g. (40 percent) of amorphous racemic 6',7'-dimethoxydihydrocinchotoxine.

EXAMPLE 11

Preparation of Racemic 6',7'-Dimethoxydihydrocinchonidinone and Racemic 6',7'-Dimethoxydihydrocinchoninone from Racemic 6',7'-Dimethoxydihydrocinchotoxine To a solution containing 14.5 g. of racemic 6',7'-dimethoxydihydrocinchotoxine in 200 ml. of dichloromethane was added 25 ml. of about a 17 percent aqueous sodium hypochlorite, and the mixture was stirred vigorously for 60 min. The organic phase was separated, washed with water, dried over anhydrous sodium sulfate, and evaporated to a volume of about 20 ml. This solution containing the chloramine was added dropwise to 60 ml. of 99.5 percent phosphoric acid. The cosolvent was evaporated and the viscous mixture stirred at 20° for 4 hours. The mixture was diluted with water and made alkaline with 6N sodium hydroxide. The alkaline phase was allowed to reach about 40°, and was extracted with ether. The ethereal phase was dried over anhydrous potassium carbonate and concentrated to dryness. The product (12.8 g.) was absorbed on 100 g. of neutral alumina, activity II. Elution with benzene and dichloromethane yielded 9.2 g. (65 percent) of an amorphous mixture comprising racemic 6',7'-dimethoxydihydrocinchonidinone and racemic 6',7'-dimethoxy-dihydrocinchoninone.

EXAMPLE 12

Preparation of a Mixture of racemic 6'-Chlorodihydrocinchonidinone and Racemic 6'-Chlorodihydrocinchoninone from Racemic 6'-Chlorodihydrocinchotoxine To a solution containing 13.6 g. of racemic 6'-chlorodihydrocinchotoxine in 200 ml. of dichloromethane was added 18 ml. of about a 17% aqueous sodium hypochlorite and the mixture was stirred for 60 min. The organic phase was separated, washed with water, dried over anhydrous sodium sulfate and concentrated to a volume of about 20 ml. This solution, containing the chloramine, was added dropwise to 60 ml. of 99.5 percent phosphoric acid. The solvent was evaporated, and the viscous mixture was stirred at 20° for 17 hours. The mixture was diluted with water, and made alkaline with 6N potassium hydroxide. The alkaline aqueous phase was kept at about 70° for 30 min., and, thereafter, it was extracted thoroughly with ether. The ethereal phase was dried over anhydrous potassium carbonate and concentrated to dryness. The product (11.7 g.) was absorbed on 100 g. of neutral alumina, activity II. Elution with benzene and dichloromethane yielded 9.3 g. (69%) of racemic 6'-chlorodihydrocinchonidinone and racemic 6'-chlorodihydrocinchoninone which was crystallized from hexane to give 7.56 g. of a product having a melting point of 97.5°–100.5° containing some chlorine free impurity. A crystalline mixture of racemic 6'-chlorodihydrocinchonidinone and racemic 6'-chlorodihydrocinchoninone was prepared also by reoxidizing a mixture of racemic 6'-chlorodihydrocinchonine and racemic 6'-chlorodihydrocinchonidine.

EXAMPLE 13

Preparation of Racemic 6'-Methyldihydrocinchotoxine from cis (1-benzoyl-3-ethyl-4-piperidinepropionic acid ethyl ester and 6-methyl-4-carbethoxyquinoline A solution containing 19.6 g. of cis (1-benzoyl-3-ethyl-4-piperidinepropionic acid ethyl ester in 600 ml. of dry benzene was added dropwise (3½ hours) to a refluxing mixture comprising 20.3 g. of 6-methyl-4-carbethoxyquinoline and 20.8 g. of potassium t-butoxide in 300 ml. of dry benzene under an atmosphere of dry nitrogen. The mixture was heated under reflux for an additional hour and maintained at 20° overnight. The crude mixture was extracted once with 200 ml. and three times with 20 ml. of cold 0.5N aqueous potassium hydroxide. Thereafter, the aqueous phases were washed with 4 portions of 50 ml. of benzene. The combined alkaline aqueous phases containing the crude β-ketoester were acidified with conc. HCl whereby a 6N hydrochloric acid solution was obtained, and then heated under reflux for 24 hours. The cooled mixture was made alkaline with 6N potassium hydroxide, and extracted with ether. The ethereal extracts were dried over anhydrous potassium carbonate and evaporated to dryness to give 13.1 g. (68 percent) of racemic 6'-methyl-dihydrocinchotoxine.

EXAMPLE 14

Preparation of a Mixture of racemic 6'-Methyl-dihydrocinchonidinone and racemic 6'-Methyl-dihydrocinchoninone from racemic 6'-Methyl-dihydrocinchotoxine To a solution containing 13.1 g. of racemic 6'-methyl-dihydrocinchotoxine in 150 ml. of dichloromethane was added an excess of about 17 percent aqueous sodium hypochlorite solution, and the mixture was stirred at 20° for 1 hour. The organic phase was separated, washed with water, dried over anhydrous sodium sulfate and concentrated to 20 ml. This solution, containing the chloramine, was added dropwise to 50 ml. of 99.5 percent phosphoric acid. The dichloromethane was evaporated, and the viscous mixture was stirred at 20° for 17 hours. Thereafter, the mixture was diluted with 20 ml. of water and made alkaline with 6N potassium hydroxide. The alkaline aqueous phase was maintained at 40° for 30 min., and subsequently extracted with dichloromethane. The organic extracts were dried over anhydrous sodium sulfate and concentrated to dryness to give 13.2 g. of a crystalline product. A portion was recrystallized twice from hexane to give about a 1:1 mixture of 6'-methyl-dihydrocinchonidinone and racemic 6'-methyl-dihydrocinchoninone having a melting point of 105°–108°.

EXAMPLE 15

Preparation of racemic N-benzoyl-6',7'-methylenedioxy-cinchotoxine

A solution of 15.8 g. of racemic N-benzoyl-homomeroquinene ethyl ester in 200 ml. of anhydrous tetrahydrofuran was added during 90 minutes to a gently refluxing mixture of 14.7 g. of 6,7-methylenedioxy-4-carbethoxyquinoline ethyl ester and 16.8 g. of potassium-t-butoxide in 250 ml. of anhydrous tetrahydrofuran under an atmosphere of dry nitrogen. After completed addition refluxing was continued for an additional 3 hours. The solvent was removed under reduced pressure and the residue was dissolved in 200 ml. of 0.5N sodium hydroxide. The solution was washed with benzene twice and rendered acidic by the addition of 3N hydrochloric acid. The acidic solution was extracted three times with a benzene-ether mixture. The combined organic extract was washed with water, dried over sodium sulfate and evaporated to dryness under reduced pressure to give 20 g. of crude racemic α-[1-benzoyl-3-vinyl-4-piperidylmethyl]-β-oxo-β-(6,7-methylenedioxy-4-quinolyl)-propionic acid ethyl ester.

A solution of the crude α-[1-benzoyl-3-vinyl-4-piperidylmethyl]-β-oxo-β-(6,7-methylenedioxy-4-quinolyl)-propionic acid ethyl ester (20 g.) in 200 ml. of 6N hydrochloric acid was heated under reflux for 1 hour. The cooled reaction mixture was washed with ether, made alkaline with 6N sodium hydroxide and extracted thoroughly with an ether-benzene mixture. The organic extract was dried over sodium sulfate and concentrated to dryness to give 9.5 g. of residue. Chromatography of this material (7.9 g.) on silica gel with ethyl acetate as eluant afforded 6.17 g. (28 percent) of racemic N-benzoyl-6',7'-methylenedioxy-cinchotoxine. The free base (630 mg.) was dissolved in an excess of ethanolic hydrogen chloride. Addition of ether to the solution precipitated 560 mg. of crystalline racemic N-benzoyl-6',7'-methylenedioxy-cinchotoxine hydrochloride (4.HCl), m.p. 142°–144°. Recrystallization from ethanol-ether afforded analytically pure hydrochloride of racemic N-benzoyl-6',7'-methylenedioxy-cinchotoxine, m.p. 145°–147°.

EXAMPLE 16

Preparation of racemic 6',7'-methylenedioxy-cinchotoxine

A solution of 5.3 g. of racemic N-benzoyl-6',7'-methylenedioxy-cinchotoxine in 350 ml. of a methanol-water mixture (3:1) was heated under reflux for 48 hours. After the addition of 100 ml. of water the solution was concentrated under reduced pressure and extracted repeatedly with a benzene-ether mixture. The combined organic extract was washed with water, dried over sodium sulfate and evaporated under reduced pressure to give 3.2 g. of oily residue. Trituration with acetone afforded 1.65 g. (41 percent) of crystalline racemic 6',7'-methylenedioxy-cinchotoxine, m.p. 130°–131°.

Anal. Calcd for $C_{20}H_{22}N_2O_3$ (338.39): C, 70.98; H, 6.55; N, 8.28 Found: C, 70.72; H, 6.63; N, 8.09.

What is claimed is:

1. A compound of the formula

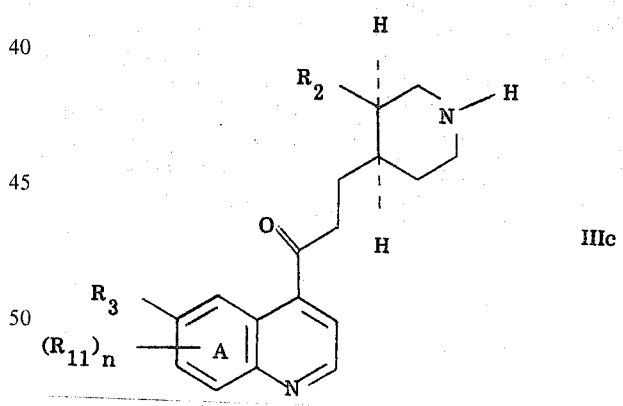

IIIc wherein $n$ is 1 or 2; $R_2$ is ethyl or vinyl; $R_{11}$ is hydrogen, hydroxy, methyl, ethyl, propyl, butyl, methoxy, trifluoromethyl, or chloro, or when $n$ is 2, $R_{11}$ taken together with an adjacent $R_{11}$, is also methylenedioxy; when $R_{11}$ is hydrogen, $R_3$ is methyl, ethyl, propyl, butyl, trifluoromethyl, or chloro; when $R_{11}$ is other than hydrogen and $n$ is 1, $R_3$ is methoxy, methyl, ethyl, propyl, hydrogen, trifluoromethyl, or chloro, or taken together with an adjacent $R_{11}$, is methylenedioxy; and when $R_{11}$ is other than hydrogen and $n$ is 2, $R_3$ is hydrogen, antipodes or racemates thereof.

2. A compound in accordance with claim 1, wherein $R_2$ is ethyl.

3. The compound in accordance with claim 2, 7'-methoxy-dihydrocinchotoxine.

4. The compound in accordance with claim 2, racemic 7'-methoxy-dihydrocinchotoxine.

5. The compound in accordance with claim 2, racemic 6'-chloro-dihydrocinchotoxine.

6. The compound in accordance with claim 2, racemic 6'-methyl-dihydrocinchotoxine.

7. The compound in accordance with claim 2, 6',7'-dimethoxy-dihydrocinchotoxine.

8. The compound in accordance with claim 2, racemic 6',7'-dimethoxy-dihydrocinchotoxine.

9. A compound in accordance with claim 1, wherein $R_2$ is vinyl.

10. A compound of the formula

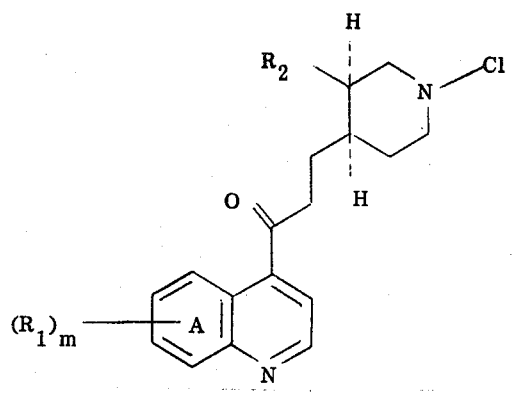

IV antipodes or racemates thereof, wherein $m$ is 0 to 2; $R_1$ is hydrogen, hydroxy, halogen, methyl, ethyl, propyl, butyl, methoxy or trifluoromethyl, or when $m$ is 2, $R_1$, taken together with an adjacent $R_1$, is also methylenedioxy; and $R_2$ is ethyl or vinyl.

11. A compound in accordance with claim 10, wherein $R_2$ is ethyl.

12. The compound in accordance with claim 11, N-chloro-7'-methoxy-dihydrocinchotoxine.

13. The compound in accordance with claim 11, racemic N-chloro-7'-methoxy-dihydrocinchotoxine.

14. The compound in accordance with claim 11, racemic N-chloro-6-methyl-dihydrocinchotoxine.

15. The compound in accordance with claim 11, racemic N-chloro-6-chloro-dihydrocinchotoxine.

16. The compound in accordance with claim 11, N-chloro-dihydroquinotoxine.

17. The compound in accordance with claim 11, 6,7-dimethoxy-4-[3-(1-chloro-3(R)-ethyl-4(R)-piperidyl)-1-oxopropyl]-quinoline.

18. The compound in accordance with claim 11, racemic 6,7-dimethoxy-4-[3-(1-chloro-3(R)-ethyl-4(R)-piperidyl)-1-oxopropyl]quinoline.

19. A compound in accordance with claim 10, wherein $R_2$ is vinyl.

20. The compound in accordance with claim 19, N-chloro-quinotoxine.

* * * * *